United States Patent [19]
Zimmer et al.

[11] 3,937,538
[45] Feb. 10, 1976

[54] ROLLER BEARING ASSEMBLY

[75] Inventors: George A. Zimmer; William K. Weidman; Charles M. Allaben, all of Ithaca, N.Y.

[73] Assignee: Borg-Warner Corporation, Chicago, Ill.

[22] Filed: Oct. 7, 1974

[21] Appl. No.: 512,644

Related U.S. Application Data

[62] Division of Ser. No. 393,084, Aug. 30, 1973, which is a division of Ser. No. 267,307, June 29, 1972, abandoned.

[52] U.S. Cl. ............... 308/207 R; 308/194; 308/214
[51] Int. Cl.² .......................................... F16C 13/00
[58] Field of Search ........ 308/194, 207 R, 212, 214, 308/216

[56] References Cited
UNITED STATES PATENTS

| | | | |
|---|---|---|---|
| 637,204 | 11/1899 | Heath | 308/194 |
| 2,048,972 | 7/1936 | Scheffler | 308/194 |
| 2,620,241 | 12/1952 | Potter | 308/194 |
| 2,632,677 | 3/1953 | Potter | 308/194 |

*Primary Examiner*—Robert R. Song
*Assistant Examiner*—Richard A. Bertsch
*Attorney, Agent, or Firm*—Aubrey L. Burgess

[57] ABSTRACT

A sealed roller bearing having a double row of tapered rollers is disclosed. The bearing is insertable into and retainable within a rigidly mounted pillow housing such as a block casting or the like, such that the orientation of the bearing or flange is independent from the orientation of the housing. This self-aligning bearing is replaceable, without removing the housing from its mounting, and the dimensions of the bearing and housing are such that the assembly can be installed in place of existing non-self-aligning or fixed housings without modification of the installation site. Generally the fixed housing-bearing assemblies are small, compact and of relatively few parts. The assembly disclosed is compact, small and of relatively few parts, yet is fully self-aligning.

2 Claims, 18 Drawing Figures

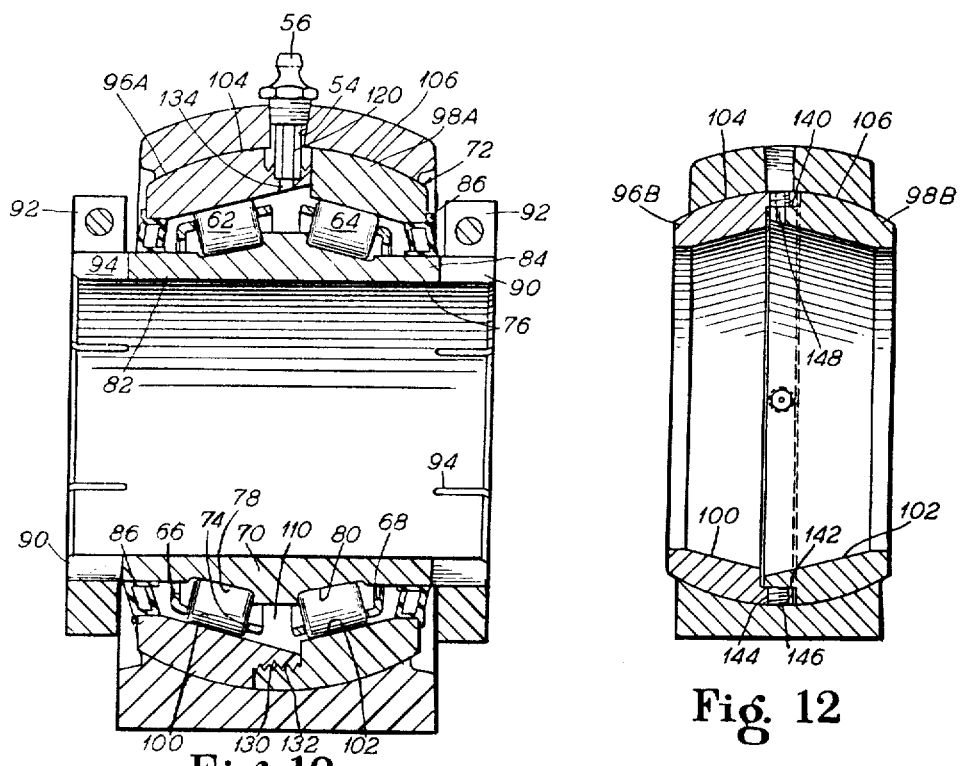
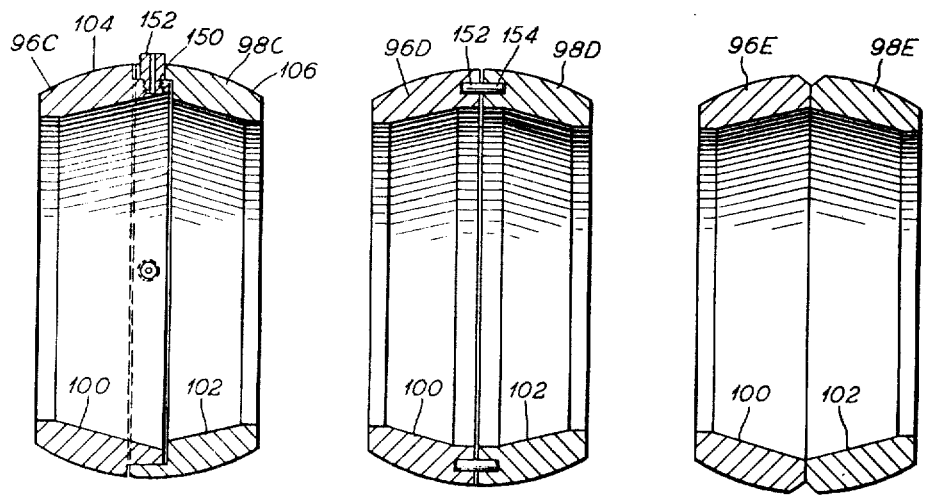

ROLLER BEARING ASSEMBLY

This application is a division of our copending application Ser. No. 393,084, filed Aug. 30, 1973 which in turn is a division of application Ser. No. 267,307 filed June 29, 1972, now abandoned.

BACKGROUND OF THE INVENTION

Housings with roller bearings are well known. Generally, there are two types of these assemblies. The fixed type contains a fixed position roller bearing assembly which is capable of handling only slight shaft misalignment. These units are usually compact, of relatively few parts, and require only a minimum of space. A second type is known as a "self-aligning" and permits greater shaft misalignment. Self-aligning units are usually more complex, larger, require a greater number of parts, and are generally more expensive.

THE INVENTION

We propose a double row of tapered rollers assembled into an integral, sealed unit which can be installed in and/or removed from a fixed rigid housing without disturbing the mounting of the housing itself; and which is self-aligning with respect to the housing when installed and retained therein. The housing is generally a casting, such as a pillow block or a flange block as is generally known in the art.

The bearing comprises: (1) two groups of truncated conical rollers. The rollers in each group are equally spaced in a circle and oriented so that the apeces of all the cones formed by projecting the surfaces of the rollers meet at a single point. The envelope generated by the centerlines of the rollers in each group are itself a right circular cone. The two conical groups are oriented relative to each other so that their axes lie on a common line with their apeces pointing away from each other. The large ends of the rollers of one group are adjacent to but spaced from the large ends of the rollers in the other group; (2) two roller retainers, one for each group of rollers. Each retainer is of such size and shape as to fit between the races without impeding relative rotary motion therebetween, and each contains perforations disposed to receive the rollers and space them circumferentially equally in their operational orientation without substantially impeding the rotary of revolutionary motions of said rollers; (3) an inner race having an inside diameter disposed to receive and support a shaft having substantially the same diameter as said inside diameter, and having an outside configuration comprising two conical raceways. The axis of symmetry of each raceway coincides with the axis of symmetry of the other and also with the axis of the inside diameter of the race. Each raceway is disposed to receive the conical rollers of one of the groups of rollers in theoretical line contact when operationally oriented. The inner race has two surfaces, each located axially outward from one of the raceways, providing space for installation of sealing means; and extensions beyond one or both of the sealing surfaces to accommodate means for securing the inner race to the shaft; (4) means at one or both ends of the inner race to secure the inner race to the shaft and prevent rotary and/or axial motion therebetween; (5) an outer race made from at least two pieces, each having at its inside surface a truncated conical raceway disposed to receive the rollers of one of the groups in theoretical line contact. Each outer race piece has at its outer surface a truncated spherical configuration whose center falls on the axis of the inner conical surface. The orientation of the two pieces of the outer race relative to each other is such that when both conical inner raceways are simultaneously positioned relative to their groups of rollers in proper operational orientation, the projections of the two spherical outer surfaces are substantially coincident. One or both of the outer race halves are provided with a hole through which lubricant can be introduced into the bearing unit. Each race half is provided with a surface located at the small end of the roller raceway which extends axially outward therefrom to provide space and a support surface for the sealing means previously mentioned; and (6) sealing means disposed in the annular space between said inner and outer races axially outward from the said roller raceways. The sealing means is configured to prevent escape of lubricant and/or immission of contaminants without substantially impeding the relative rotary motion between the races.

THE DRAWINGS

FIG. 10, is a sectional view through another embodiment of a roller-bearing according to this invention;

FIGS. 12, 13, 14 and 15 are sectional views through other embodiments of roller bearings according to this invention.

DETAILED DESCRIPTION

Reference is now made to the drawings and especially FIGS. 1, 2, 4, 5, 7 and 8. Here are illustrated three general types of pillow block housings in which the bearings of this invention can be used. Before describing the bearings in detail, the various general types of pillow block housings will be described. It should be understood that there may be modifications of each housing type and it should be understood that the bearings can be used with other types of housings, such as flange blocks and the like; this does not imply that the bearings to be described will not operate equally as well with the modfied housings.

Figure 1:
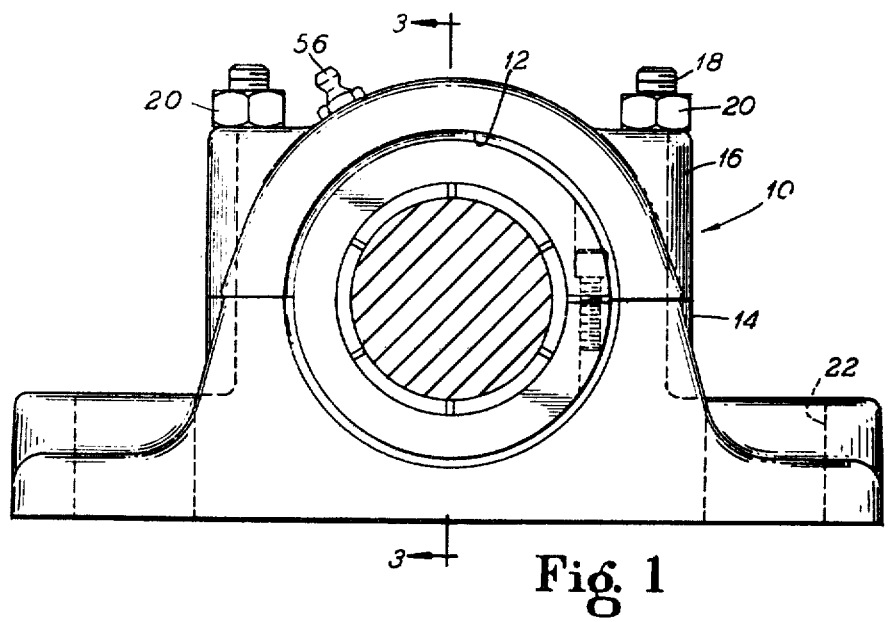
FIG. 1 is a side elevation of split pillow block with a bearing unit therein.
Figure 2:
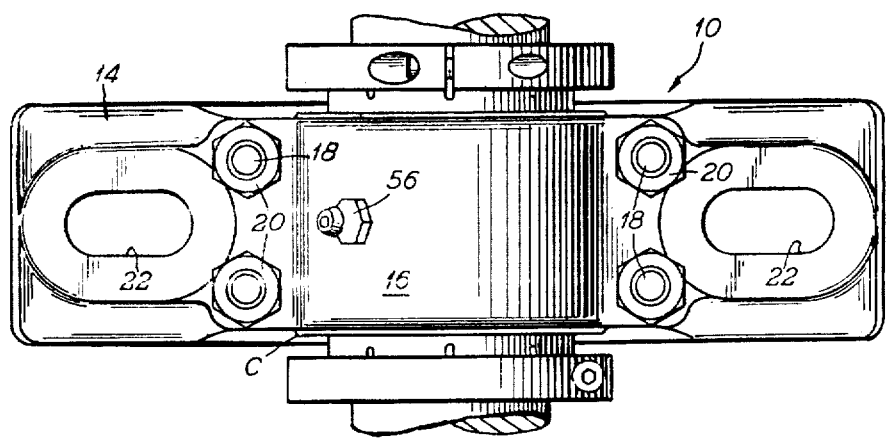
FIG. 2 is a top view of FIG. 1.

FIGS. 1 and 2 illustrate a split block housing, generally identified as 10, split along a plane passing through a cavity or socket 12 and generally parallel to the base of the housing and also to the surface on which the housing is mounted, such that the longitudinal axis of the shaft to be supported will pass through the plane at the center of the socket 12 to receive a bearing C and so as to have a base 14 and a top 16. The parts 14 and 16 are joined by bolts 18 extending from the base 14 through the top 16. Nuts 20 are used to tighten the parts and to retain them assembled. The base 14 is provided with elongated openings 22 for receiving bolts (not shown) by which the block is fixed to a support. The openings 22 permit lateral adjustment as is required for accommdating a shaft (now shown) to which the bearing C is connected.

To remove or install a bearing C, the top part 16 is removed and the bearing is lifted from the base 14. Another bearing is inserted to seat in the base 14, the top 16 is then replaced and is bolted to the base 14.

Using a split block housing provides ease of installation and replacement of bearings. However, a split block housing may be bulkier and more expensive to manufacture then other types which will be described.

Figure 4:
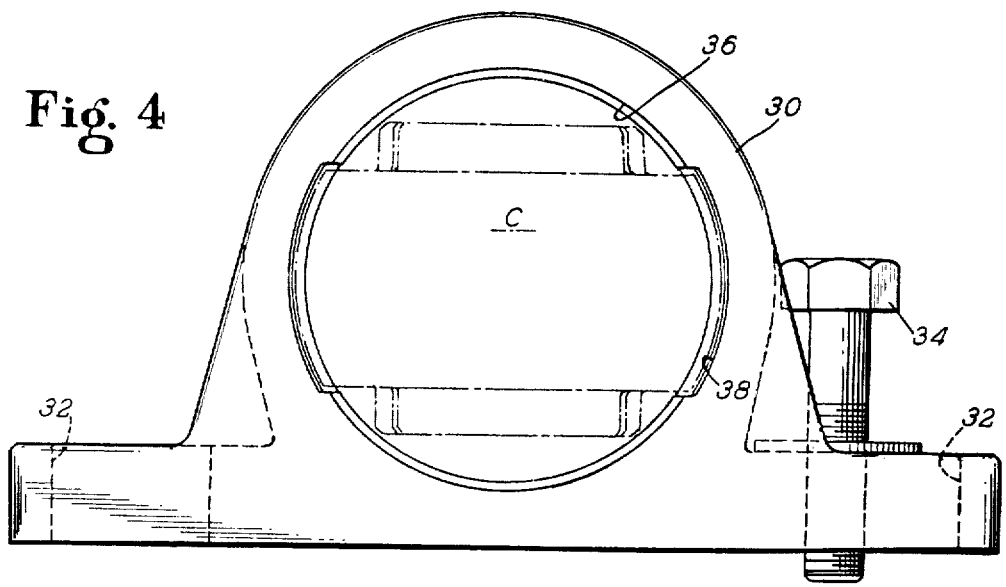
FIG. 4 is a side elevation of a pillow block with a loading slot for inserting a bearing and illustrated with a bearing being loaded therein.
Figure 5:
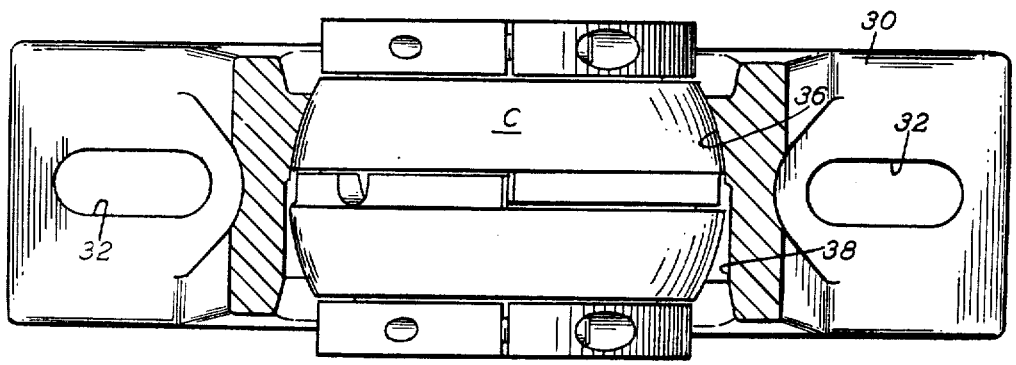
FIG. 5 is a sectional view taken on line 5—5 of FIG. 4 showing the bearing in operating position.
Figure 6:
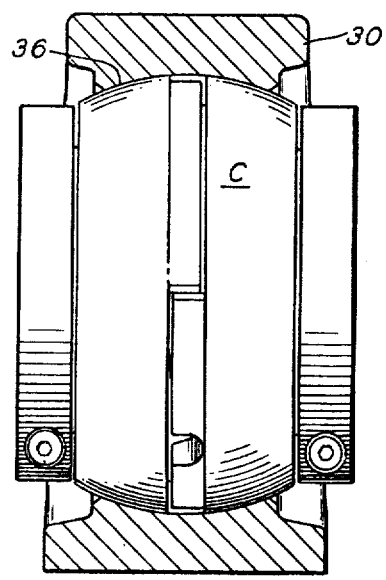
FIG. 6 is a cross-sectional view of a pillow block taken on line 6—6 of FIG. 4 with the bearing in operating position.

Another type of pillow block housing is illustrated in FIGS. 4 and 5. This type comprises a one piece block member 30 having its base portion provided with elongated openings 32 for receiving bolts 34 by which the block is attached to a support, the openings 32 being elongated to provide for lateral adjustment of the block position. The block member 30 is provided with a spherical socket or cavity 36 of such dimension to properly receive a bearing C. To permit the insertion of a bearing, the block is formed with a loading slot 38 having cylindrical ends of a radius at least as large as the spherical radius of the bearing and a width at least as wide as the outer race assembly of the bearing. The loading slot extends from a center plane of the block member 30 axially to one open end of the socket 36. A bearing is inserted or removed from this type of block by turning the bearing, so that its axis is perpendicular to the axis of the block (as seen in FIG. 4) and the plane of the bearing perpendicular to its axis is parallel to the plane of the loading slot. The bearing is then inserted or removed through the slot. The bearing is inserted in the housing until the center of its spherical surface coincides with the center of the spherical socket of the housing and it is then rotated until its axis is parallel and coincident with the axis of the block.

At times, depending on the particular design of the assembly, there may be disadvantages in using the loading slot block housing in that the length of the inner race of the bearing is limited. In a similar manner the amount of block material retaining the bearing on the loading side of the housing may be diminished as compared with other types of housings. In some applications, there are no disadvantages or they rate nil.

Figure 7:
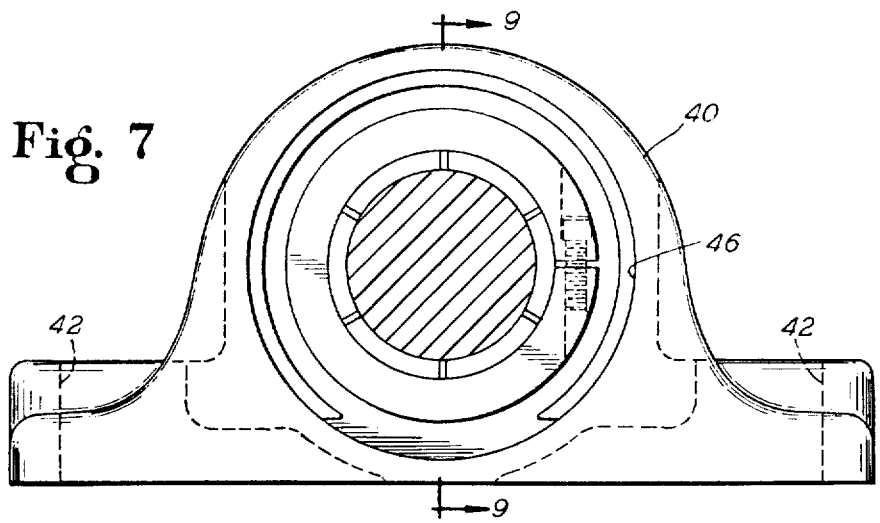
FIG. 7 is a side elevation of a third type of pillow block with a bearing therein.
Figure 8:
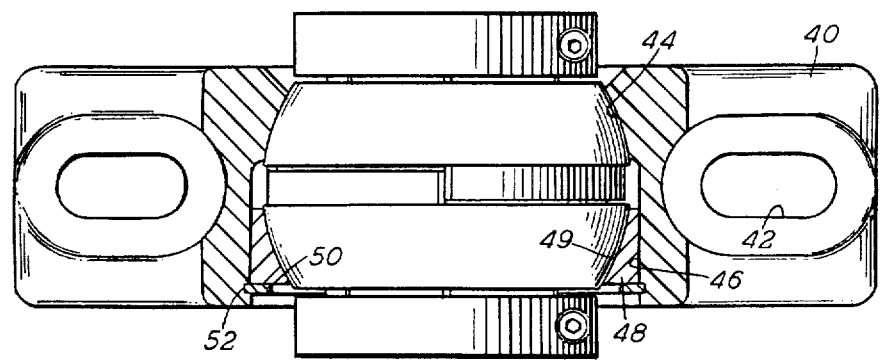
FIG. 8 is a sectional view taken on line 8—8 of FIG. 7 showing the bearing in full lines.
Figure 9:
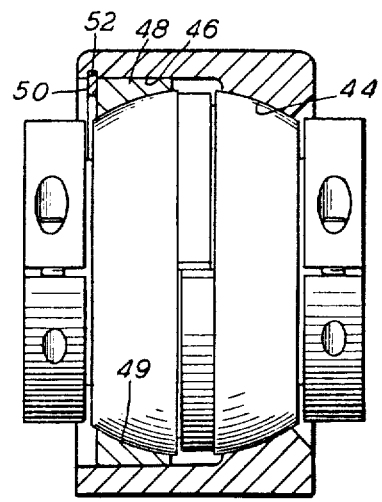
FIG. 9 is a cross-sectional view taken on line 9—9 of FIG. 7 showing the bearing in full lines.

A third type of pillow block housing is illustrated in FIGS. 7 and 8. Here the block member 40 is provided with elongated slots 42 by which it can be bolted to a support for lateral adjustment and is bored to form a spherical seat 44 and a cylindrical bore, 46, the diameter of the bore 46 being at least as large as the largest diameter of the spherical surface of a bearing. An adapter ring 48 having an outside diameter substantially equal to the diameter of the bore 46 and an inside spherical surface 49 similar to that of the surface 44 is inserted in the bore 46 to retain the bearing in position. The adapter ring may be formed so as to be shimmed or wedged into position to accommodate variations in the size of parts measured parallel to the longitudinal axis of the shaft. A split, snap ring 50 fitting into slot 52 formed in the block holds the adaptor ring and the bearing in place. To insert or replace a bearing requires removal of the ring 50, removal of the adaptor ring 46, and the insertion of a bearing. The adaptor ring and snap ring must then be replaced. If shimming or wedging of the adaptor ring is required, it is accomplished prior to the assembly of the snap ring 50.

The construction just described can be modified by providing a housing such as a block casting with a cylindrical bore. In such a construction, a pair of adaptor and snap rings are used to retain the bearing in position, one at each end of the block or bearing. This construction provides additonal adjustment by the use of shims and/or wedges in positioning the adaptor rings and thus the bearing.

In each of the types of pillow blocks described, the top portion of the housing is drilled and tapped at 54 to receive a conventional lubrication fitting 56 through which lubricant is introduced between the bearing and the block. A locating pin, such as the pin 120 in FIGS. 10 and 11 to locate the bearing relative to the housing can be used, if desired. Such a pin keeps the hole in the bearing in alignment with the hole in the housing to insure a continuous path for introduction of lubricant.

Each bearing C, to be described, will fit into each of the housing types described. Also, each bearing is substantially the same in some respects. The main difference between the bearing types is the outer race construction. Thus, in the description which follows, the same reference characters will be used for like parts.

The bearing C in all figures is identified as 60 and comprises two groups of truncated conical rollers 62, 64, the rollers in each group being equally spaced in a circle with the large ends of the rollers of one group being adjacent to but spaced from the large ends of the rollers in the other group. There are two roller retainers 66, 68, one for each group of rollers, and each of such size and shape as to fit between the inner and outer races 70, 72, respectively, without impeding relative rotary motion therebetween. Each retainer contains perforations 74 disposed to receive the rollers and space them circumferentially equally to their operational orientation without substantially impeding the rotary or revolutionary motions of said rollers. The inner race 70 has an inside diameter 76 disposed to receive and support a shaft (not shown) of substantially the same diameter and has an outside configuration comprising two conical raceways, 78, 80 with axes that coincide with each other and also with the axis of the inside diameter. The raceways 78, 80 are disposed to receive the conical rollers of the aforesaid two groups in theoretical line contact when operationally oriented. The inner race 70 and the outer race 72 include surfaces 82, 84 respectively, each located axially outward from one of the raceways to provide space for installation of sealing means 86 between the races 70, 72, and the inner race has extensions 90 beyond one or both of the sealing means to accommodate means 92 for securing the inner race 70 to the shaft and prevent rotary and/or axial motion therebetween. The extensions 90 may be slotted or otherwise configured at 94, if desired.

The sealing means 92 which are disposed in the annular space between the inner and outer races 70, 72, axially outward from the rollers are configured to prevent escape of lubricant and/or immission of contaminants without substantially impeding the relative rotary motion between the said races.

Figure 3:
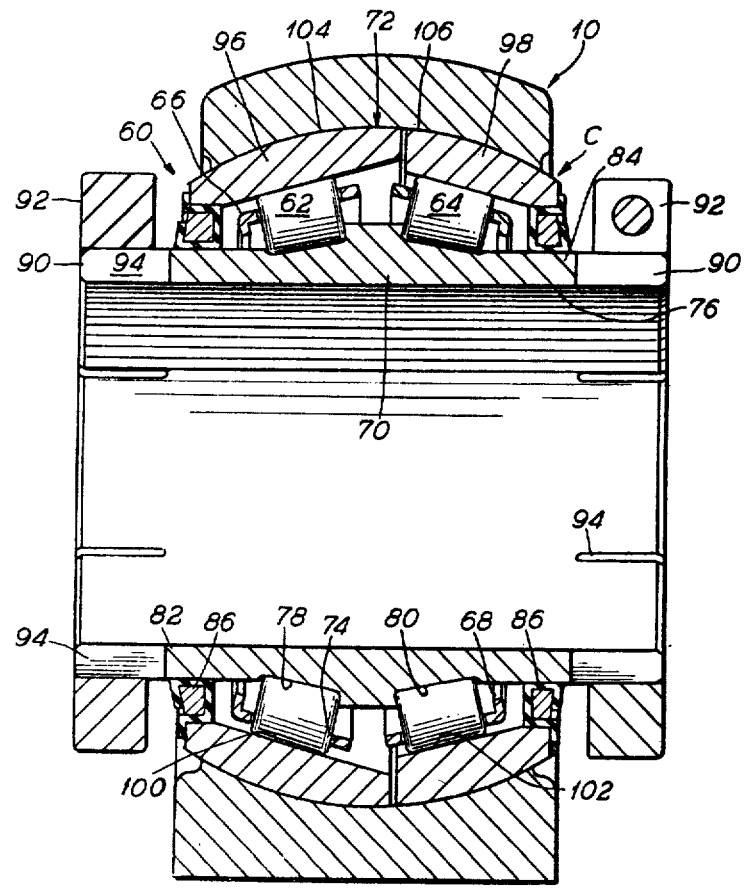
FIG. 3 is a cross-sectional view of the split pillow block taken on line 3—3 of FIG. 1 with one embodiment of a bearing unit constructed according to this invention.

Each illustrated bearing 60 has its outer race 72 made from at least two pieces, 96, 98 (FIG. 3), 96A, 98A (FIG. 10), 96B, 98B (FIG. 12), 96C, 98C (FIG. 13) 96D, 98D (FIG. 14) and 96E, 98E (FIG. 15). Each piece or part has at its inside surface a truncated conical raceway 100, 102 disposed to receive the rollers of one of the aforesaid groups of rollers in theoretical line contact, and each piece or part has at its outer surfaces 104, 106 a truncated spherical configuration whose center falls on the major axis of the inner conical surface of the housing. The orientation of the two pieces of the outer race relative to each other is such that when both conical inner raceways are simultaneously positioned relative to their groups of rollers in proper operational orientation, the projections of the two spherical outer surfaces 104, 106 are substantially coincident. One or both of the outer race halves are provided with a hole 108 through which lubricant can be introduced into the chamber 110 of the bearing, and each race half is provided with the surface 84 located at the small end of the roller runway and extending axially outward therefrom to provide space and support for the sealing means 86 previously described.

FIGS. 3, 3A, 3B and 3C show two identical race halves, 96, 98 each having a plurality of axially extending tongues 112 and gaps 114 between the tongues, the angular extent of the tongues and gaps being substantially equal so that when the two halves are assembled together, the tongues on each half will fit into the gaps in the other half with a substantially surface-to-surface fit along surfaces 116 at the sides of the tongues. By virtue of such fit, the axes of the two halves will substantially coincide, being both parallel and concentric. The embodiment of the race halves illustrated here shows two tongues and two gaps, but this is by way of example and not restrictdion; any member of tongues and gaps that can be practially fabricated can be used. Regardless of the number of tongues decided upon, at least one of them must be provided with a slot or hole 108 through which lubricant can be introduced into the cavity between the races. If the race halves are identical, then there will also be a slot 108 in the mating half that will serve no purpose.

In a slightly different embodiment of the present invention, not shown in the drawings, the slot 108 can be located with its axial centerline coinciding with one of the mating surfaces 116, so that surface 116 would be supplanted by half of the slot 108. By proper orientation of the two halves at assembly, the two half slots would become a whole slot for introduction of lubricant.

Figure 3A:
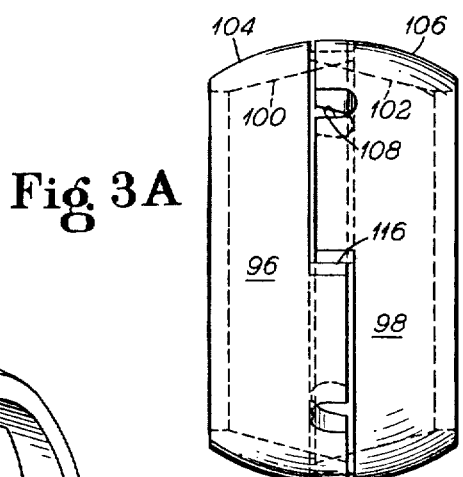
FIG. 3A is an elevational view of the outer race means shown in FIG. 3.
Figure 3B:
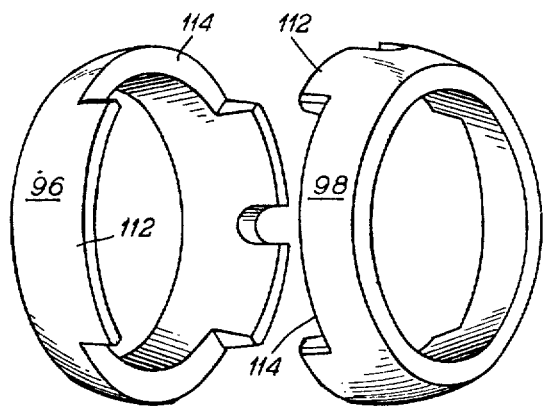
FIG. 3B is an exploded view of the outer race means shown in FIG. 3.
Figure 3C:
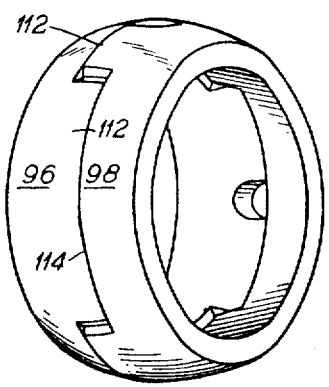
FIG. 3C is a view showing the outer race means of the FIG. 3B embodiment assembled.

FIGS. 3B and 3C show the two race halves 96, 98 which assembled together to make the outer race 72. The fit between the race halves is intended to range from surface-to-surface to a slight interference, thus assuring that the surfaces 116 are positively in contact. The axial length of the tongues 112 is such that when the outer race halves are assembled over a roller inner race assembly having the shortest permissible length and smallest permissible outside diameter, the surfaces 122 at the ends of the tongues of either outer race half will touch the surfaces 124 at the bottoms of the gaps of the other race half. Thus, it will always be possible to push the two outer race halves together until each is in contact with a circle of rollers while both circles of rollers are also in contact with the inner race 70. During the assembly process, the outer race halves are pushed together until the condition just described exists, and then are separated by a predetermined distance, known as "bench end play". This predetermined distance can vary depending on the end use of the bearing. With the outer race halves in this position relative to each other, they can be welded together along the contacting surfaces 116 by known welding processes.

Figure 11:
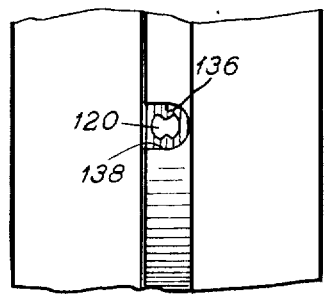
FIG. 11 is a view taken on line 11—11 of FIG. 10.

FIGS. 10 and 11 show a bearing in which the outer race 72 is made up of two pieces 96A, 98A, which are joined by being screwed together by means of the mating threads 130, 132. After assembly, the pin 120 positioned in a hole 134 through which lubricant is introduced into the bearing cartridge, prevents the race assembly from coming unscrewed. The hole 134 is formed from an opening 136 in part 96A and a slot 138 in part 98A. If the number of openings 136 differs by one from the number of slots 138, then there will be, by application of the Vernier principle, many possible angular orientations of the race halves relative to each other where a retaining pin 120 can be inserted, thereby providing adjustment of the axial spacing between the raceways and their fit relative to the rollers. Race halves 96A, 98A can also be prevented from becoming unscrewed by gluing the thread together with a known chemical bonding agent.

FIGS. 12 and 13 show outer race assemblies each composed of two outer race halves 96B, 98B or 96C, 98C respectively, which, while they have identical conical roller raceways 100, 102 and identical spherical outer surfaces 104, 106, are dissimilar in the regions where they fit together. In these embodiments, in one outer race half of each assembly, the surface of the internal conical raceway is extended to and beyond the center of the assembly while the outside surface is turned down about half its thickness to a cylindrical surface 140. In the other outer race half of each assembly, the outer spherical surface is extended to and beyond the center of the assembly and the inside surface is bored out about half its thickness to a cylindrical surface 142 of substantially the same diameter as the cylindrical surface of the mating race half. The cylindrical fit between the parts must be such that the said parts can readily be assembled while maintaining mutual concentricity.

The differences between the outer race assemblies are in the means for holding them together after assembly. In the assembly of FIG. 12, the outer race half 96 B is provided with a plurality of holes 144 extending radially and positioned over the cylindrical interface between the race halves. The holes are tapped to receive set screws 146. The set screws 146 do not project radially outward beyond the spherical surface of the outer race and are therefore very short in relation to their diameter. To provide sufficient socket to permit adequate tightening, the wrench socket in each set screw may extend through the screw. The outer race half is provided with one radially extending hole 148, through the cylindrical surface, similar to that described in the FIG. 10 embodiment, the hole being located about on the centerline of the ultimate outer race assembly and having a diameter slightly smaller than the sealing diameter of the set screws. When the outer race halves are assembled, they are angularly oriented, so that the hole 148 in the outer race half is aligned with one of the set screw holes in the outer race half; thus by virtue of the hole and the wrench socket extending all the way through the set screw, a path is provided for introduction of lubricant into the chamber between the outer and inner race and the set screw seals the lubricant introduction hole 148. Axial spacing of the outer race halves is established as previously described, after which the spacing is maintained by tightening down the set screws.

In FIG. 13 of the drawing, the two race halves 96C and 98C are glued together using a suitable adhesive, with or without the help of an interference or shrink fit between the parts. As before, a hole or slot 150 is provided in the assembled race for the introduction of lubricant. A pin or the like 152 plugs the hole 150; if fits loosely or is fluted, so that lubricant can be introduced with the pin in place.

The two outer race halves 96D and 98D of outer race assembly 72 shown in FIG. 14 are joined by a plurality of radially oriented dowel pins 152 inserted through holes 154 in both race halves. The holes 154 are fabricated into each race half prior to initial assembly. Dowel pins 152 are pressed into the mating holes 154 to hold the outer race halves together and maintain proper spacing and alignment. The holes may be the same diameter and used with straight dowels; or stepped dowels may be used with the holes in one half being smaller than the holes in the other half. At least one of the dowels should have a hole through it through which lubricant can be introduced into the chamber between the inner and outer races.

In FIG. 15 of the drawing the outer race assembly is made up of two identical race halves 96E, 98E. The race halves are joined by being butt welded while they are held in a fixture to assure mutual concentricity. The various components are assembled for proper fit (i.e. correct bench end play), or to attain correct clearance, one or both of the race halves are made too thick and are finished to proper size for assembly.

Another form of outer race assembly is similar to that previously described with respect to FIG. 14 in that the race halves are identical to each other and a spline is used to hold them together. The spline may be a solid ring that is a press fit into grooves in the race halves either at its I.D. or at its O.D. or both, or may be split ring that is a press fit in the slots by virtue of being thicker than the width of one or both slots.

It is desirable in all of the bearings described heretofore that the hole provided in the outer race of the bearing for the introduction of lubricant be of such a configuration that it can readily be plugged, so that such a bearing, if to be used as a replacement in an existing housing, can be factory lubricated and shipped and/or stored without losing lubricant. The plug is removable for inserting the locating pin and is configured for the introduction of additional lubricant, as is needed, by usual means through the lubricant fitting in the block.

We claim:

1. A self-aligning roller bearing assembly for use with a housing adapted to be fixed to a support and with a central opening therethrough to receive said assembly, which opening is defined by an arcuate surface, said roller bearing assembly comprising:

a pair of rows of rollers;

an inner race having a cylindrical opening for receiving and supporting a shaft;

the inner race having a pair of raceways, each having surfaces adapted to contact the rollers of a row; and an outer race;

said outer race being formed of a pair of substantially like members united by an adhesive;

each member of said outer race having an interior raceway, each said raceway having surfaces adapted to contact the rollers of a row, and an outer arcuate surface adapted to engage the arcuate surface of said housing to permit relative arcuate movement therebetween when said assembly is inserted as a unit therein, said assembly being removable as a unit and being self-aligning to accommodate shaft misalignment with respect to said support when in use in said housing because of the relative movement between said outer race and said housing.

2. In combination with a housing adapted to be fixed to a support and having a central opening therethrough defined by an arcuate surface, a self-aligning roller bearing assembly comprising:

a pair of rows of rollers;

an inner race having a cylindrical opening for receiving and supporting a shaft;

the inner race having a pair of raceways, each to contact the rollers of a row; and an outer race;

said outer race being formed of a pair of substantially like members united by an adhesive;

each member of said outer race having an interior raceway to contact the rollers of a pair, and an outer spherical surface engaging the arcuate surface of said housing to permit relative arcuate movement therebetween;

said bearing assembly being insertable and removable as a unit with respect to said housing, and because of the relative arcuate movement between said outer race and said housing being self-aligning to accommodate shaft misalignment with respect to said support.

* * * * *